Feb. 19, 1929.  D. E. ROSS  1,702,840
CONTROL ASSEMBLY
Filed Jan. 3, 1927    2 Sheets-Sheet 1
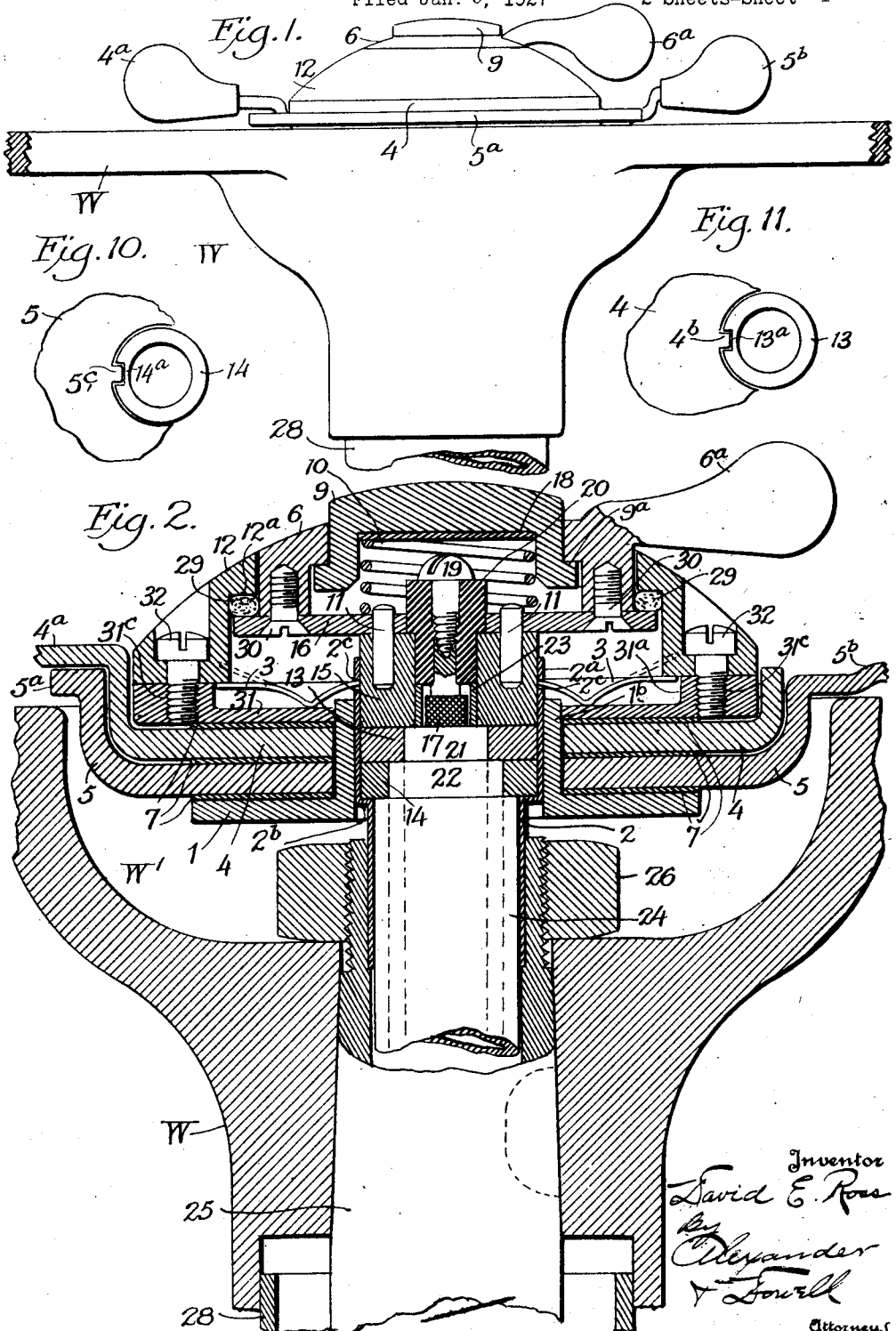

Feb. 19, 1929.  1,702,840
D. E. ROSS
CONTROL ASSEMBLY
Filed Jan. 3, 1927  2 Sheets-Sheet 2
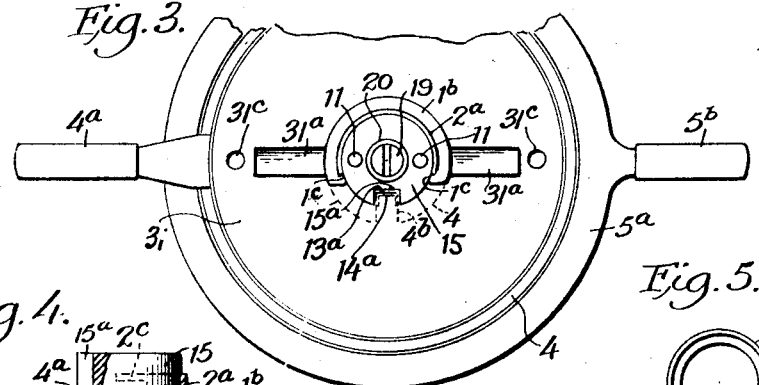
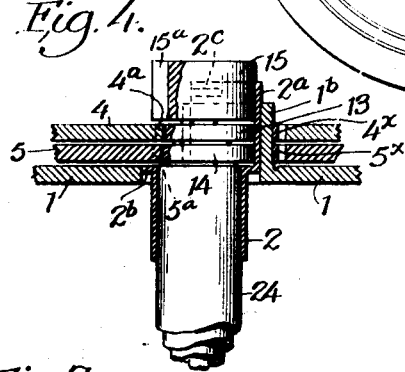
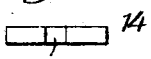
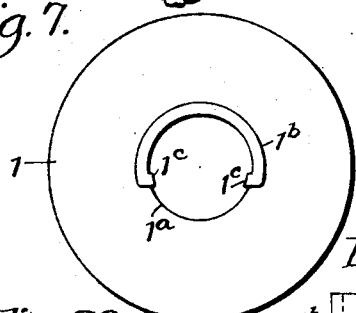
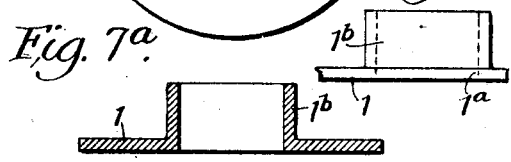
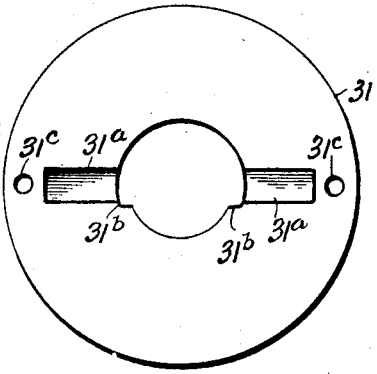
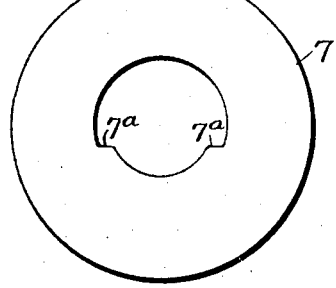
INVENTOR.
David E. Ross
BY
Alexander T. Ford
ATTORNEYS Patented Feb. 19, 1929.

1,702,840

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

CONTROL ASSEMBLY.

Application filed January 3, 1927. Serial No. 158,803.

This invention is a novel control assembly for use in connection with the steering gears of automobiles, and its object is to provide a control lever assembly which can be located within a counter bore at the hub of a steering wheel in convenient reach of the operator, each of said levers being respectively connected to its related concentrically arranged control tube extending through the steering post or tube.

Another object of the invention is to provide a construction whereby the control levers may be easily assembled or disassembled in a very simple and expeditious manner without having to remove the steering gear or disturb the nested control tubes.

Another object of the invention is to provide a control assembly wherein the control levers can be quickly disconnected from their related control tubes and removed, and the steering wheel removed from an automobile having a closed body, or a relatively low top, without having first to disarrange or disturb the control tubes; and the steering wheel and the control levers can be replaced quickly and be in proper operative relation and position when so replaced.

Another object is to provide such a control assembly with an electrical horn button mounting, so arranged that when it is desired to disassemble or remove the control levers it is not necessary to disassemble the horn button assembly.

Another object of the invention is to provide a control assembly which will occupy very little vertical space and can be substantially concealed within a counterbore in the upper end of the hub of the steering wheel.

A further object of the invention is to provide novel mechanical details of construction, and novel combinations and arrangements of parts, which will ensure durability, and economy of construction, and efficiency in operation.

Other minor objects and advantages of the invention will be hereinafter set forth.

In the accompanying drawings I have illustrated one practical embodiment of the invention, and will describe the same with reference thereto to enable others familiar with the art to adopt and use the same; but I do not consider the invention restricted to the specific construction of parts shown; and will refer to the claims for summaries of the essentials of the invention, the novel features of construction, and the novel combinations of parts, for all of which protection is desired.

In said drawings,—

Figure 1 is a side view of the control assembly mounted in a counterbore in the upper end of the hub of a steering wheel, the steering wheel being broken away.

Fig. 2 is an enlarged vertical section through the control assembly and steering wheel hub shown in Fig. 1.

Fig. 3 is a reduced plan view of the assembly with the top lever and cap member removed.

Fig. 4 is a detail section showing a modification.

Figs. 5, 5$^a$, 5$^b$ are top view, vertical section, and side view, respectively, of the supporting member 2.

Figs. 6 and 6$^a$ are top and side views of disk 14.

Figs. 7, 7$^a$, 7$^b$ are top view, vertical section, and side view, respectively, of the base member 1.

Fig. 8 is a top view of the plate 31.

Fig. 9 is a top view of one of the spacing washers 7.

Figs. 10 and 11 are details.

In the drawings I have shown the invention as embodied in a control assembly having three control tubes and levers, and a horn button. The steering wheel W is provided with a cupped shaped recess W' in its upper end, the wheel being secured to the upper end of the steering tube 25 by means of a wheel nut 26 in the usual manner, steering tube 25 being housed within an outer stationary tubular casing 28 as customary.

Within steering tube 25 is mounted a fixed tube 24, and within this tube 24 is arranged a nested series of concentric control tubes 22, 21, and 23 which might be the spark tube, gas tube, and choke tube, respectively. These parts, so far described, are all well known and may be of any suitable construction, and I will now proceed to describe the invention as applied to such control tubes.

Fixedly attached to the upper end of the fixed tube 24 is a tubular supporting member which may be formed of stamped or drawn metal and has a cylindric portion 2 which is closely fitted to the exterior and upper end of the tube 24 and secured thereto in any desired manner, preferably by brazing or welding, said portion 2 acting as a bushing between the upper ends of the fixed tube 24 and the steering tube 25. Supporting member 2 is also provided with an arcuate vertical flange portion $2^a$ of larger radius than the portion 2, and connected therewith by an annular shoulder or flange $2^b$; the part $2^a$ preferably being approximately 210 degrees in arcuate length, the same being cut away at one side for the purpose hereinafter described.

The outside diameter of the part $2^a$ is slightly smaller than the inside diameter of the threaded portion of wheel nut 26, so that the said nut and steering wheel W can be taken off or placed on the steering tube 25 without removing the supporting member 2 or disturbing the fixed tube 24.

Control tube 22 extends slightly above the upper end of fixed tube 24, and attached to the upper end thereof is a collar 14 which is preferably brazed to said tube 22, and its external diameter is such as to make an easy running fit within the arcuate portion $2^a$ to center the upper end of tube 22 in supporting member 2. Similarly, a collar 13 is brazed to the upper end of control tube 21, which extends slightly above the tube 22, collar 13 also making an easy running fit within the arcuate part $2^a$. A collar 15 is brazed or otherwise fixedly attached to the upper end of the inner control tube 23, which tube extends slightly above the upper end of control tube 21, the lower part of collar 15 also making an easy running fit within the upper part of arcuate portion $2^a$. The collars 14, 13, and 15 serve as bushings or bearings for the upper ends of their respective control tubes 22, 21, and 23.

Collar 14 is provided with a peripheral slot $14^a$ parallel with the axis of the disk; and the superimposed collar 13 has a similar slot $13^a$ in its periphery; and the collar 15 has a similar slot $15^a$; the slots in the superimposed collars are preferably made slightly larger than the slots in the underlying collars to facilitate assembly or disassembly of the parts as hereinafter described.

Fitted to the part 2 is a base member comprising a horizontal disk-like portion 1 having an axial opening $1^a$ surrounded on its upper side by a parti-cylindric vertical flange or arcuate portion $1^b$, which is adapted to fit neatly around and to the arcuate portion $2^a$ of the supporting member 2. Base member 1 may be a casting or stamping. The ends of the arcuate portion $1^b$ are provided with inwardly projecting lips or lugs $1^c$, which are adapted to engage the ends of the part $2^a$ of supporting member 2, (see Fig. 3) and prevent the base member 1 rotating on the supporting member 2. The lips or lugs $1^c$ should not extend into the part $2^a$; nor interfere with the free entry and rotation of the collars 13, 14, and 15 in the part $2^a$.

Rotatably mounted upon the horizontal flange 1 of the base member, and guided by the vertical flange $1^b$ thereof, is a lever 5 which is provided with a central opening adapted to fit over the arcuate portion $1^b$ of base member, and is preferably provided with a peripheral flange $5^a$ to cover the counterbore or recess W' in the hub of the steering wheel W. Lever 5 is further provided with an arm $5^b$, which may be finished in any suitable way, by which the lever may be rotated. The lever 5 has a radial tooth $5^c$ (see Fig. 10) adapted to engage the slot $14^a$ in collar 14, so that a rotative movement of lever 5 will impart a corresponding motion to control tube 22, the tooth $5^c$ engaging the collar 14 through the opening between the ends of the arcuate portions of the supporting member 2 and base member 1, (see Fig. 3).

Above the lever 5 is a lever 4 provided with a handle $4^a$ by which it can be turned. The lever 4 is provided with a radial tooth $4^b$ (see Fig. 11) which engages the slot $13^a$ in the periphery of collar 13, whereby rotation of lever 4 imparts rotation to the control tube 21. The teeth $4^b$ and $5^c$ will engage the ends of the arcuate portion $1^b$ of base 1, and limit the arcuate movements of the levers 4 and 5.

Anti-friction disks 7, see Figs. 2 and 9, are preferably interposed between the plate 1 and the lever 5; also between the levers 4 and 5; and between the top of lever 4 and a non-rotatable plate 31, hereinafter referred to; each disk 7 having shoulders $7^a$ (see Fig. 9) adapted to engage the ends of the arcuate portion $1^b$ to prevent rotation of the disks.

Above lever 4 is a plate 31 which is preferably circular and has a central opening having shoulders $31^b$ adapted to engage the ends of the arcuate portion $1^b$ and prevent rotation of the plate with respect to part 1. The plate 31 is also preferably provided with diametrically opposite radial recesses $31^a$ for the reception of springs 3, hereinafter referred to; and has tapped bores $31^c$ for the engagement of screws 32 by which a cap member 12 is secured to plate 31.

Each spring 3 is preferably formed of a flat metallic strip bent at an obtuse angle. The apex of the bend is seated in one of the recesses $31^a$ and one end of this spring is engaged with a slot $2^c$ (Figs. 2, $5^a$, and $5^b$) in the adjacent end of the arcuate part $2^a$, above the upper end of base member $1^b$; and the other end of the spring is engaged by and below the overhanging inner edge of the cap member 12. When the cap member 12 is drawn towards plate 31, by tightening the screws 32, the outer ends of springs 3 are depressed, the springs being fulcrumed on the plate 31; and the inner ends of springs 3 being held against vertical movement by slots $2^c$; the resultant action of the springs tends to draw the base member 1 and plate 31 together and thus frictionally bind the control levers 4 and 5 and disks 7 together. As washers 7 cannot rotate the levers 4 and 5 will thus be frictionally held in any adjusted position, and the movement of one lever will not tend to move the other. The springs 3 allow a "breathing" or yielding movement as lever 4 or 5 is turned, and compensates for any slight differences in thickness of the parts.

The construction thus far described provides for the independent rotation of control tubes 21 and 22. Obviously if desired another control tube might be arranged and operated by a lever beneath the plate 31, in the manner that lever 4 is connected with tube 21.

In the construction shown, the inner tube is operated independently of the other control tubes as follows:—The collar 15 extends above the upper end of the arcuate part 2ª of supporting member 2, and upon this collar is mounted a disk-like plate 16. The plate 16 is preferably non-rotatably engaged with collar 15 by dowel pins 11, so that when plate 16 is turned the inner tube 23 will also be turned; and on plate 16 is mounted an annulus 6 which is secured thereto by countersunk screws 30. The annulus 6 has a projecting handle 6ª by which it can be turned. The annulus 6 is fitted within a circular opening in the cap member 12, the lower part of the opening being large enough to rotatably accommodate the plate 16. Plate 16 is of larger diameter than the annulus 6, and a compressible gasket 29 is interposed between the outer edge of the plate 16, and a shoulder 12ª formed by the overhanging portion of the cap member 12 as shown in Fig. 2. By this means the lever 6 and plate 16 are rotatably retained in position in the assembly by the cap member 12; and the upper face of annulus 6 forms a continuation of the cap member 12.

In the complete assembly the handles 4ª and 5ᵇ are shown as projecting from opposite sides of the assembly in substantially the same horizontal plane; and the handle 6ª lies in a higher plane; so that the handles can be readily shifted independently.

The gasket 29 serves as a friction member between plate 16 and cap member 12, and being flexible and compressible permits screws 32 to be tightened after plate 16 has seated itself upon the collar 15, thereby allowing the springs 3 to transmit their compression through the levers 4 and 5, and the anti-friction washers 7 to the base member 1, making the whole assembly act as a unit on the supporting member 2.

An electric circuit closing device can be mounted within the annulus 6. As shown in Fig. 2 a ferrule 20 of fiber or other insulating material is fitted within the collar 15 and extends up through an axial opening in the plate 16. An insulated and armored electrical conductor 17 can be led through the tube 23, and its bared upper end is fastened to the ferrule 20 by means of a screw 19, which projects above the upper end of the ferrule and serves as one of the electrical contacts.

A button 9 is fitted within an opening in the annulus 6, and has a flange 9ª on its lower edge adapted to engage a shoulder under the adjacent edge of the opening in annulus 6 to retain the button in place. A contact plate 18 is fitted in the recess in the lower side of the button 9. The button 9 and plate 18 are yieldably urged away from the plate 16 by a spring 10, which normally holds the contact plate 18 out of engagement with the screw 19. The electrical contact devices operate on the principle of the ordinary electric doorbell push button. When the button is depressed an electrical circuit is closed through the conductor 17, contact screw 19, plate 18, spring 10, and plate 16; the metal of the assembly forming the return circuit to the battery (not shown).

If it is desired to remove the steering wheel W, this can be done by removing the cap screws 32 and flat springs 3. The horn button assembly can then be removed intact so there will be no loss of parts or time necessary to re-assemble such parts; then when the slots in the disks 13, 14, and 15 are aligned, parts 4, 5, 7, and base 1 can be removed.

The above described construction occupies a minimum of space outside of the wheel, and can be placed in a shallow counterbore W' within the wheel. The assembly permits removal of the steering wheel without requiring removal of the control tubing; which is a particularly useful feature in closed cars which ordinarily would necessitate entire removal of the steering gear, as the concentric control tubes cannot be withdrawn on account of the low roof of the closed car.

Instead of using the friction disks 7, and springs 3 as hereinbefore described, the disks 4 and 5 might be provided with bowed springs entered between opposed curved surfaces of the levers and the supporting member as indicated at 4ˣ and 5ˣ in Fig. 4. Such springs are fully shown and described in my companion application Case #7380, filed Dec. 15th, 1926, Serial No. 154,922, and Case #7387, filed December 15, 1926, Serial No. 154,923. Therefore I do not consider it necessary to illustrate or describe such springs more fully herein. Of course when such bowed springs are used the springs 3 could be dispensed with, and vice versa.

While I prefer to use the springs 3 shown in Fig. 2 I do not consider the invention restricted to the arrangement of springs shown for holding the levers 4 and 5 and disks 7 in frictional engagement; neither do I consider my invention limited to the exact form shown in the drawings; for obviously changes may be made therein within the scope of the claims.

I claim:

1. In a control assembly, a member having a parti-cylindric portion, a control tube extending into the said parti-cylindric portion; a collar attached to said tube within the said parti-cylindric portion, and a control lever rotatably mounted upon said member and having a detachable tooth and notch engagement with said collar, whereby the tube may be turned by the lever.

2. In a control assembly, a supporting member, a control tube, and a control lever rotatably supported on said member and having a detachable engagement with said tube, whereby the tube may be turned by the lever, a plate above the lever, a cap member and springs fulcrumed on the plate, and each having one end engaged with the supporting member and the other end with the cap member whereby the plate is caused to frictionally bind the lever in any adjusted position.

3. In a control assembly, a member having a tubular portion attachable to a supporting tube and an upstanding parti-cylindric portion; a control tube extending into the said parti-cylindric portion of the supporting member; a slotted collar attached to said tube within the said parti-cylindric portion and a control lever rotatably mounted upon said member and having a tooth entered between the ends of said parti-cylindric portion and engaging said collar, whereby the tube may be turned by the lever.

4. In combination with a control assembly as set forth in claim 3, said member having a flange supporting the lever, a top plate, a cap member attached to said plate, and springs fulcrumed on the plate and each having one end engaged with the supporting member and the other end with the cap member whereby the plate is caused to frictionally bind the lever in any adjusted position.

5. In a control assembly, a supporting member having a tubular portion attachable to a supporting tube and having an upstanding parti-cylindric portion; a base member non-rotatably but slidably mounted upon the supporting member and having an upstanding parti-cylindric portion concentric with the parti-cylindric portion of the supporting member; a control tube extending into the said parti-cylindric portions, a collar attached to said tube within the said parti-cylindric portions, and a control lever rotatably mounted upon said base member and having a detachable engagement with said collar, whereby the tube may be turned by the lever.

6. In a control assembly, a supporting member having a tubular portion attachable to a supporting tube and having an upstanding parti-cylindric portion; a base member non-rotatably but slidably mounted upon the supporting member and having an upstanding parti-cylindric portion concentric with the parti-cylindric portion of the supporting member; a control tube extending into the said parti-cylindric portions, a notched collar attached to said tube within the said parti-cylindric portions, and a control lever rotatably mounted upon said base member and having a tooth detachably engaged with the notch in said collar, and means for holding the lever in adjusted position.

7. In a control assembly, a member attachable to a supporting tube, a cap member indirectly mounted on said first member and having an axial opening, a control tube disposed axially of said members, a lever rotatably mounted in the opening of the cap member, and a plate attached to said lever and non-rotatably and detachably connected to the upper end of the control tube; and means whereby said plate and lever are confined in position by the cap member.

8. In combination a supporting tube, a member attached thereto, a plate carried by said member, a cap member detachably attached to said plate and having an axial opening; a control tube disposed axially of said supporting member, a collar attached to said tube, a lever fitted in the opening of the cap member and detachably and non-rotatably attached to said tube, and means for frictionally holding the lever in position.

9. In combination a supporting tube, a supporting member attached thereto, a plate carried by said member, a cap member detachably attached to said plate and having an axial opening, a control tube disposed axially of said supporting member, a collar attached to said tube, a plate detachably and non-rotatably engaged with said collar, a lever fitted in the opening of the cap member and attached to said plate and having a handle by which it may be turned; and means interposed between the plate and cap member for frictionally holding the lever in position.

10. In a control assembly, a member attachable to a supporting tube, a control tube extending into the said member; a collar attached to said tube and a control lever rotatably mounted upon said member and having a detachable engagement with said collar; a cap member having an axial opening; a second control tube disposed axially of said members, and a second lever rotatably mounted in the cap member and detachably attached to the upper end of the control tube, and means whereby said second lever is confined in position by the cap member.

11. In a control assembly, a member attachable to a supporting tube, and having a parti-cylindric portion, a control tube extending into the said parti-cylindric portion; a collar attached to said tube within the said parti-cylindric portion, and a control lever rotatably mounted upon said member and having a detachable tooth and notch engagement with said collar; with a cap member indirectly mounted on said first member and having an axial opening, a second control tube disposed axially of said members, and a second lever rotatably mounted in the cap member and detachably attached to the upper end of the control tube, and means whereby said second lever is confined in position by the cap member.

12. In a control assembly, a member attachable to a supporting tube, a control tube extending into the said member; a slotted collar attached to said tube within the said parti-cylindric portion, and a control lever rotatably mounted upon said member and detachably engaging said collar with a cap member indirectly mounted on said first member and having an axial opening, a second control tube disposed axially of said members, a lever rotatably mounted in the opening of the cap member, and a plate attached to said lever and non-rotatably and detachably connected to the upper end of the control tube; and means whereby said plate and lever are confined in position by the cap member.

13. In a control assembly, a member having a tubular portion attachable to a supporting tube, and an upstanding parti-cylindric portion; a control tube extending into the said parti-cylindric portion of the supporting member; a slotted collar attached to said tube within the said parti-cylindric portion, and a control lever rotatably mounted upon said member and having a tooth entered between the ends of said parti-cylindric portion and engaging said collar, whereby the tube may be turned by the lever; with a cap member indirectly mounted on said first member and having an axial opening, a second control tube disposed axially of said members; a collar thereon; a lever rotatably mounted in the opening of the cap member, and a plate attached to said lever and non-rotatably and detachably connected to the collar on the second control tube; and means whereby said plate and lever are confined in position by the cap member.

14. In a control assembly a supporting member adapted to be attached to the upper end of a supporting tube, a base member slidably mounted upon the supporting member, a plurality of control tubes disposed axially of said members, a collar on the upper end of each tube, a plurality of superimposed control levers rotatably mounted upon the base member concentric to the collars, each lever detachably engaging the related tube collar; a plate slidably mounted upon the base member above the levers, a cap member on said plate; and friction means for holding the control levers in adjusted position.

15. In a control assembly as set forth in claim 14, the said friction means including friction disks between the levers and radially disposed springs fulcrumed on the plate and each having one end engaged with the supporting member and the other end engaged under the cap member.

16. In a control assembly a supporting member adapted to be attached to the upper end of a supporting tube and having a parti-cylindric upper portion, a base member slidably mounted upon the supporting member and having a parti-cylindric portion concentric with the parti-cylindric portion of the base member, a plurality of control tubes disposed axially of said members, a collar on the upper end of each tube within the parti-cylindric portion of the supporting member, a plurality of superimposed levers rotatably mounted upon the base member concentric to the collars, each lever detachably engaging the collar on the related tube, a plate slidably mounted upon the base member above the levers, a cap member on said plate; and friction means for holding the control levers in adjusted position.

17. In a control assembly as set forth in claim 16, the friction means including friction disks between the levers and radially disposed springs fulcrumed on the plate and each having one end engaged with the supporting member and the other end engaged under the cap member.

In testimony that I claim the foregoing as my own, I affix my signature.

DAVID E. ROSS.